United States Patent
Shaw

(10) Patent No.: US 10,366,597 B2
(45) Date of Patent: *Jul. 30, 2019

(54) EMERGENCY EVENT VIRTUAL NETWORK FUNCTION DEPLOYMENT AND CONFIGURATION

(71) Applicant: AT&T Intellectual Property I, L.P., Atlanta, GA (US)

(72) Inventor: Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,728

(22) Filed: Feb. 12, 2018

(65) Prior Publication Data

US 2018/0174429 A1 Jun. 21, 2018

Related U.S. Application Data

(63) Continuation of application No. 15/167,330, filed on May 27, 2016, now Pat. No. 9,892,622.

(51) Int. Cl.
*H04Q 9/00* (2006.01)
*G08B 25/00* (2006.01)
*H04L 12/24* (2006.01)

(52) U.S. Cl.
CPC ........ *G08B 25/006* (2013.01); *H04L 41/0681* (2013.01); *H04L 41/0816* (2013.01); *H04Q 9/00* (2013.01); *H04Q 2209/40* (2013.01); *H04Q 2209/823* (2013.01)

(58) Field of Classification Search
None
See application file for complete search history.

(56) References Cited

U.S. PATENT DOCUMENTS

| | | | |
|---|---|---|---|
| 5,668,951 A * | 9/1997 | Jain | H04L 47/10 709/235 |
| 6,400,687 B1 * | 6/2002 | Davison | H04L 12/5602 370/230 |
| 6,760,328 B1 * | 7/2004 | Ofek | H04L 12/40058 370/389 |
| 8,250,598 B2 | 8/2012 | Velazquez et al. | |
| 8,291,114 B2 * | 10/2012 | Mao | H04L 63/02 709/242 |
| 8,804,740 B2 * | 8/2014 | Rangaraman | H04L 45/38 370/392 |

(Continued)

*Primary Examiner* — Fekadeselassie Girma

(57) ABSTRACT

A method, computer-readable medium, and device for deploying virtual network functions in response to detecting an emergency event are disclosed. A method may detect an emergency event associated with a first location, deploy a first virtual network function on a first host device of the wireless network in a central zone associated with the first location, in response to detecting the emergency event, and configure a first alarm threshold for the first virtual network function that is indicative of a type loading condition at the first virtual network function. The method may further deploy a second virtual network function on a second host device of the wireless network in a second zone and configure a second alarm threshold for the second virtual network function that is indicative of the type of loading condition at the second virtual network function.

20 Claims, 4 Drawing Sheets

(56) References Cited

U.S. PATENT DOCUMENTS

| | | | |
|---|---|---|---|
| 8,972,550 B2 | 3/2015 | Fan et al. | |
| 9,077,615 B2* | 7/2015 | Vasseur | H04L 41/0663 |
| 9,246,755 B2 | 1/2016 | DeCusatis et al. | |
| 9,253,026 B2 | 2/2016 | DeCusatis et al. | |
| 9,584,597 B2* | 2/2017 | James | H04L 67/1004 |
| 9,843,624 B1* | 12/2017 | Taaghol | H04L 67/10 |
| 9,892,622 B2* | 2/2018 | Shaw | H04L 41/0816 |
| 2002/0052941 A1* | 5/2002 | Patterson | G06F 9/5061 |
| | | | 709/223 |
| 2007/0248029 A1* | 10/2007 | Merkey | H04L 43/02 |
| | | | 370/255 |
| 2009/0276771 A1* | 11/2009 | Nickolov | G06F 9/4856 |
| | | | 717/177 |
| 2012/0131579 A1* | 5/2012 | Pujolle | H04L 12/4641 |
| | | | 718/1 |
| 2013/0124712 A1* | 5/2013 | Parker | H04L 41/5038 |
| | | | 709/224 |
| 2014/0313898 A1 | 10/2014 | Yae et al. | |
| 2014/0317293 A1* | 10/2014 | Shatzkamer | G06F 9/455 |
| | | | 709/226 |
| 2015/0180730 A1* | 6/2015 | Felstaine | H04L 41/022 |
| | | | 709/225 |
| 2015/0208316 A1 | 7/2015 | Mosko et al. | |
| 2015/0288767 A1 | 10/2015 | Fargano et al. | |
| 2015/0381493 A1 | 12/2015 | Bansal et al. | |
| 2016/0080211 A1 | 3/2016 | Anand et al. | |
| 2016/0117446 A1* | 4/2016 | Hussam | G16H 10/60 |
| | | | 705/3 |
| 2016/0352924 A1* | 12/2016 | Senarath | H04M 15/8016 |
| 2016/0353268 A1* | 12/2016 | Senarath | H04W 4/24 |
| 2017/0012870 A1* | 1/2017 | Blair | H04L 12/4633 |
| 2017/0026301 A1* | 1/2017 | Keller | H04L 47/621 |
| 2017/0099159 A1* | 4/2017 | Abraham | H04L 12/4641 |
| 2017/0099313 A1* | 4/2017 | Singuru | H04L 12/4625 |
| 2017/0104609 A1* | 4/2017 | McNamee | H04L 12/4641 |
| 2017/0345281 A1* | 11/2017 | Shaw | H04L 41/0816 |
| 2018/0078178 A1* | 3/2018 | Caden | A61B 5/11 |
| 2018/0174429 A1* | 6/2018 | Shaw | H04L 41/0816 |

\* cited by examiner

EMERGENCY EVENT VIRTUAL NETWORK FUNCTION DEPLOYMENT AND CONFIGURATION

This application is a continuation of U.S. patent application Ser. No. 15/167,330, filed May 27, 2016, now U.S. Pat. No. 9,892,622, which is herein incorporated by reference in its entirety.

The present disclosure relates generally to methods, computer-readable media and devices for deploying virtual network functions in response to detecting emergency events.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, and the like may be instantiated from the common resource pool.

SUMMARY

In one example, the present disclosure discloses a method, computer-readable medium, and device for deploying virtual network functions in response to detecting an emergency event by a processor. For example, the processor may detect an emergency event associated with a first location, deploy first virtual network function on a first host device of the wireless network in a central zone associated with the first location, in response to detecting the emergency event, and configure a first alarm threshold for the first virtual network function that is indicative of a type loading condition at the first virtual network function. The processor may further deploy a second virtual network function on a second host device of the wireless network in a second zone, in response to detecting the emergency event, and configure a second alarm threshold for the second virtual network function that is indicative of the type of loading condition at the second virtual network function. In one example, the first alarm threshold is less than the second alarm threshold.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
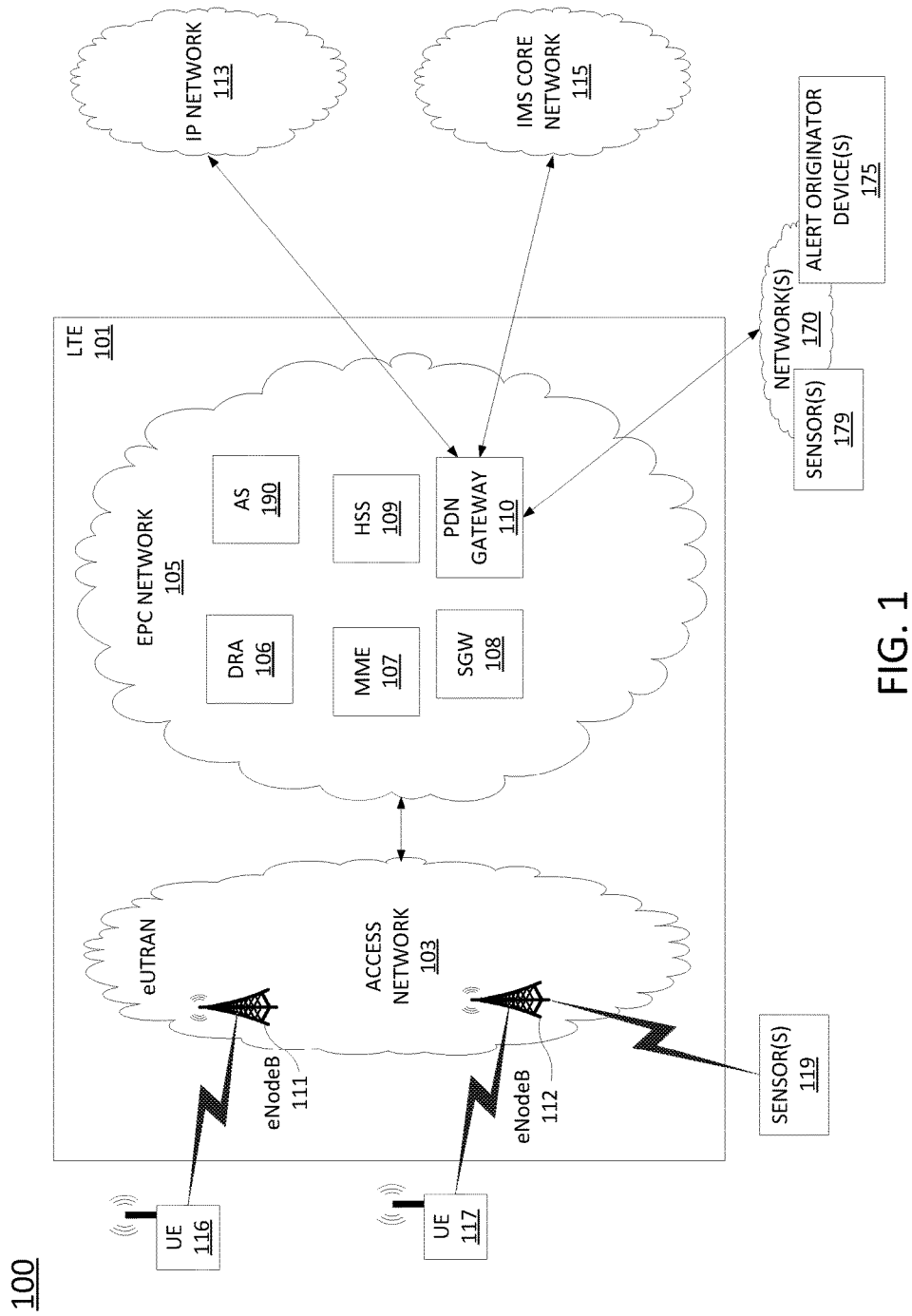
FIG. 1 illustrates an example system related to the present disclosure.

The present disclosure broadly discloses methods, computer-readable media and apparatuses for deploying virtual network functions in response to detecting emergency events. During normal conditions, a wireless network may be capable of sustaining typical traffic without any issues. However, during emergency events, such as during natural disasters, severe weather events, public health or epidemiological events, and the like, the traffic may surge exponentially. The wireless network may become overloaded and no longer able to sustain the traffic. In one example, a software defined network (SDN) architecture may enable a wireless network to scale up or down in the face of changing traffic demands by adding and removing virtual network functions (VNFs), e.g., virtual machines. However, when a VNF becomes congested in a rapid manner and reaches an overload condition, the VNF may already be in a "drowning" state, where the VNF may be so overloaded that it is unable to respond to status requests or to send alerts to other network components, such as other VNFs, hypervisors and/or host devices, a SDN controller, non-NFVI devices in the network, and so forth. As such, an overloaded VNF may not be able to perform its network function e.g., a mobility management entity (MME), a Diameter routing agent (DRA), a home subscriber server (HSS), a serving gateway (SGW), a packet data network gateway (PGW), etc., to inform a hypervisor to reassign additional resources to the VNF, to terminate or handoff traffic to other VNFs, or to inform upstream devices to reduce traffic to the VNF via rate limiting, throttling, etc.

In accordance with the present disclosure a cellular/wireless network may include software defined network (SDN) components, or virtual network functions (VNFs), and may deploy and configure VNFs in response to emergency events, e.g., natural disasters, including geophysical events, such as a landslide, earthquake, or levee breach, meteorological events, such as windstorms, tornados, hurricanes, tsunamis, lightning storms, thunderstorms, hurricanes, freezing rain, blizzards, fog, etc., public health events, such as chemical, biological, radiological, nuclear or explosive (CBRNE) threat or attack, or the like, and epidemiological events, such as disease outbreaks, spread of diseases, and so forth. In one example, a SDN controller or application server deployed in the wireless network may detect an emergency event. In one example, the detection may include receiving an alert from a responsible agency, such as National Oceanic and Atmospheric Administration (NOAA), Centers for Disease Control and Prevention (CDC), other federal, state, or local agencies, or an international organization. In another example, the detection may be based upon a sensor network that may be part of the wireless network or controlled by the wireless network. Alternatively, or in addition, a sensor network may feed various measurements to the wireless network or may send alerts to the wireless network. For instance, a plurality of seismologic sensors may be deployed throughout a region and may detect earthquakes and tremors. Similarly, a plurality of anemometers may be deployed to gather wind measurements, which may be used to detect a storm front, a path of a tornado, and so forth.

In one example, the emergency event may be detected with respect to a location. For instance, a sensor network may have sensors deployed in known locations. Thus, for example, if there is a tornado, one or more anemometers may have readings above a threshold that is indicative of a tornado, e.g., wind speeds greater than 70 miles per hour, greater than 100 miles per hour, etc. In one example, a location may comprise a central locus of an event. For instance, if ten anemometers have readings above 100 miles per hour that may be indicative of a tornado, the location of the tornado may comprise a geographic center of the various sensors. In response to detecting an emergency event with respect to a location, the present disclosure may deploy a number of VNFs in anticipation of network impacts of the emergency event that is detected.

In one example, the type of VNFs may be selected based upon the type of emergency event, in addition to selecting the location(s) to deploy the VNFs. The locations of the VNFs may be selected to be within or near the location in which the public emergency is detected. For example, as a tornado passes, based upon a "signature" or historical information regarding past tornado events, it may be known that a large number of phone calls may be generated to and from mobile endpoint devices that are within the path of the tornado and/or nearby. In addition, it may be known or anticipated that attempts to place outgoing calls may peak immediately after the tornado has passed, when people within the path of the tornado may attempt to place calls to inform of their conditions, such as to indicate that they are fine, or to request medical assistance. Thus, in one example, when a tornado is first detected by the wireless network, the wireless network may deploy additional VNFs at or near the location at which the tornado was detected, e.g., in one or more data center(s) having network function virtualization infrastructure (NFVI)/host devices closest to the tornado location.

In one example, additional zones surrounding the location may be defined by the wireless network in which additional VNFs may be deployed. For instance, the zones may be defined concentrically around the location in which the emergency event is first detected. In one example, a first zone may comprise a central zone, or region, in which the number of additional VNFs is most concentrated. In one example, the central zone includes the location in which the emergency event is first detected. In one example, a second zone surrounding the central zone may be defined, and additional VNFs may also be deployed in the second zone. However, the number of additional VNFs that are deployed in the second zone may have a lesser concentration than the number of VNFs in the central zone, e.g., less VNFs per registered mobile endpoint device, less VNFs per square mile of coverage area, etc. Additional VNFs may be deployed in a third zone, albeit with a lesser concentration than the second zone, and so forth. Thus, there may be a "gradation" of additional VNFs deployed in the network, moving from a central zone, centered on a location in which the public emergency is detected, to subsequent zones moving outward from the center.

In one example, zones may be defined concentrically around a location. However, in other examples, zones may be defined differently. For instance, if an emergency event is detected near a coastal location, concentric zones may include areas that are over water. Therefore, asymmetrical zones, or irregular shaped zones, may be more appropriate. In addition, demographic information may indicate that the network impacts will not be balanced around a central zone. For example, suburbs of a particular city may be concentrated to the west of the city center, while there may be mountains to the east of the city center with far fewer people. Thus, asymmetrical zones may also be appropriate around such a location. In one example, a zone generating method may utilize mobile endpoint device registration information to determine a number of mobile endpoint devices within an area.

In one example, alarm thresholds for overloading conditions may also be set differently for VNFs in the different zones surrounding the location where the emergency event is detected. For example, during an emergency event, the network traffic may surge exponentially, overloading the network such that it is no longer able to sustain the traffic. In addition, when a VNF becomes congested and reaches overload condition, the VNF may be in the drowning state, i.e., it may be so overloaded that it is unable to respond and/or alert other VNFs and other network infrastructures. The VNF may also not be able to properly terminate and handover to other VNFs, or to inform an upstream VNF or other network device to reduce traffic volume via rate limiting and/or throttling, etc. As such, a lesser alarm threshold may be set for VNFs that are in the central zone or in zones closer to the central zone. For instance, an alarm threshold may be set at 50 percent capacity for VNFs in the central zone, while an alarm threshold of 70 percent may be set for VNFs of a same or a similar type in the second zone. Thus, there may be a "gradation" of alarm thresholds moving from a central zone, centered on a location in which the emergency event is detected, to subsequent zones moving outward from the center. It should be noted that different types of VNFs in a same zone may have different alarm thresholds. For instance, a virtual MME (vMME) may have a different alarm threshold, or set of alarm thresholds, than a virtual SGW (vSGW).

In one example, when an alarm is generated in a zone, the alarm threshold(s) implemented in VNFs in the next zone moving outward may be adjusted downward, and so on, zone-by-zone. For instance, if an alarm is generated by a VNF in the central zone, the alarm may be propagated to the VNFs or non-NFVI devices in the next zone, and/or to a SDN controller. In response, the alarm threshold(s) for the VNFs in the next zone may be changed from 70 percent to 50 percent, for example. In this way, as the network impacts of the emergency event may spread geographically, the network impacts may be anticipated and accounted for before different regions of the network are actually overloaded. In addition, in one example other network elements may adjust various parameters in response to receiving a notification of the alarm condition at the VNF that is reporting. For instance, if a VNF has reached an alarm threshold, other upstream network elements (including both VNFs and non-NFVI components that send traffic to the VNF) may implement rate limiting to send less traffic to the VNF, to slow the rate of sending, etc. For example, the upstream network element(s) may select a sending rate to correspond to a current alarm threshold for the VNF. For instance, if a VNF reaches an alarm threshold and the alarm threshold is adjusted downward, the new alarm threshold may be communicated to the upstream network element(s) which may then select an appropriate sending rate based upon the new alarm threshold.

In one example, the number of VNFs in a zone may also be increased if an alarm is generated in a central zone and/or in a zone that is closer to the central zone. In addition, the zones may be adjusted from time to time based on various factors. For instance, the central zone may be moved as a tornado moves through a region, and the subsequent zones may be adjusted accordingly. In one example, the shifting of the central region may be based upon relevant measurements, such as wind speed measurements that may detect the movement of a storm front or the current location of a tornado. In another example, the changing location of the emergency event may be provided via a data feed from a relevant agency. For instance, a data feed from NOAA may explicitly define a current geographic location/area of a thunderstorm. In addition, the geographic location may be updated on a regular basis via subsequent messages in the data feed. Once the central zone is adjusted, the deployment of additional VNFs and the provisioning of alarm thresholds may be revised for the new central zone and the zones surrounding the central zone in a similar manner as described above. These and other aspects of the present disclosure are discussed in greater detail below in connection with the examples of FIGS. 1-4.

To better understand the present disclosure, FIG. 1 illustrates an example network, or system 100 in which embodiments of the present disclosure for deploying virtual network functions in response to detecting an emergency event may operate. In one example, the system 100 comprises a Long Term Evolution (LTE) network 101, an IP network 113, and a core network, e.g., an IP Multimedia Subsystem (IMS) core network 115. In one example, system 100 is provided and operated by a cellular/wireless network operator. FIG. 1 also illustrates various mobile endpoint devices 116 and 117, e.g., LTE user equipment or user endpoints (UE). The mobile endpoint devices UE 116 and 117 may each comprise a cellular telephone, a smartphone, a tablet computing device, a laptop computer, a pair of computing glasses, a wireless enabled wristwatch, or any other cellular-capable mobile telephony and computing device (broadly, "mobile endpoint devices").

In one example, the LTE network 101 comprises an access network 103 and a core network, Evolved Packet Core (EPC) network 105. In one example, the access network 103 comprises an evolved Universal Terrestrial Radio Access Network (eUTRAN). The eUTRANs are the air interfaces of the 3$^{rd}$ Generation Partnership Project (3GPP) LTE specifications for mobile networks. In one example, EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, all eNodeBs in the access network 103 are in communication with the EPC network 105. In operation, mobile endpoint device 116 may access wireless services via the eNodeB 111 and mobile endpoint device 117 may access wireless services via the eNodeB 112 located in the access network 103. It should be noted that any number of eNodeBs can be deployed in an eUTRAN. In one illustrative example, the access network 103 may comprise one or more eNodeBs.

In EPC network 105, network devices such as Mobility Management Entity (MME) 107 and Serving Gateway (SGW) 108 support various functions as part of the LTE network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscribers location. The EPC network 105 may also comprise a public data network (PDN) gateway 110 which serves as a gateway that provides access between the EPC network 105 and various data networks, e.g., other IP networks 113, an IMS core network 115, and the like. The public data network gateway is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) in IMS core network 115.

Figure 2:
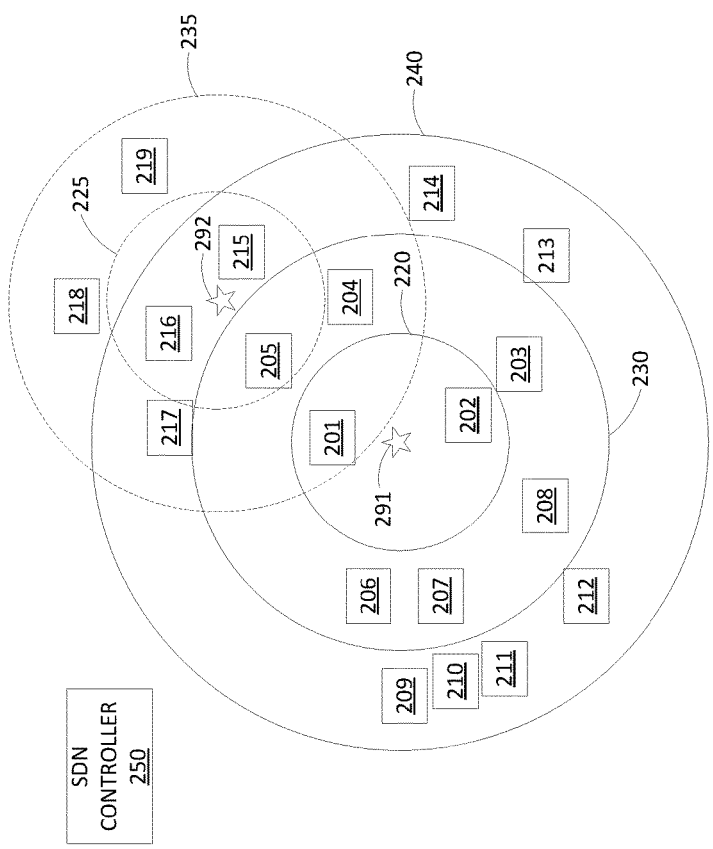
FIG. 2 illustrates an additional example system related to the present disclosure.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. For instance, EPC network 105 may be expanded to include additional PDN gateways, e.g., in the form of vPGWs, additional serving gateways (SGWs), e.g., in the form of vSGWs, and so forth. In one example, the SDN host devices may be deployed in one or more geographically diverse data centers. Accordingly, in one example, the network may be segregated into a number of zones, where different VNFs may be deployed in different zones depending upon the respective locations of the one or more data centers. The example of FIG. 2 illustrates this concept in greater detail.

In one example, the EPC network 105 may also include an application server (AS) 190. In one embodiment, AS 190 may comprise a computing system, such as computing system 400 depicted in FIG. 4, and may be configured to provide one or more functions for deploying virtual network functions in response to detecting an emergency event, and for performing various other operations in accordance with the present disclosure. For example, AS 190 may be configured to perform functions such as those described below in connection with the example method 300 of FIG. 3. Accordingly, the AS 190 may be connected directly or indirectly to any one or more network elements of EPC network 105, and of the system 100 in general, that are configured to gather and forward network analytic information, such as signaling and traffic data, alarm data, and other information and statistics to AS 190 and to receive instructions from AS 190.

In one example, AS 190 may comprise a SDN controller that is responsible for instantiating, configuring, managing, and releasing VNFs. For example, in a SDN architecture, a SDN controller may instantiate virtual network functions (VNFs) on shared hardware, which may be referred to as network function virtualization infrastructure (NFVI), host devices, or SDN nodes, and which may be physically located in various places. For example SDN nodes may reside in various data centers distributed in different locations. For example, a router may be instantiated on a SDN node, and released when the router is no longer needed. Similarly, a media server may be instantiated on a SDN node, and released when no longer needed. In one example, the configuring, releasing, and reconfiguring of SDN nodes is controlled by the SDN controller, which may store configuration code, e.g., computer/processor-executable programs, instruction, code, or the like for various functions which can be loaded onto an SDN node. In another example, the SDN controller may instruct, or request an SDN node to retrieve appropriate configuration code from a network-based repository, e.g., a storage device, to relieve the SDN controller from having to store and transfer configuration code for various functions to the SDN nodes. As used herein, the terms "configured" and "reconfigured," and variations thereof, may refer to programming or loading a computing device with computer-readable/computer-executable instructions, code, and/or programs, e.g., in a memory, which when executed by a processor of the computing device, may cause the computing device to perform various functions.

In one example, AS 190 may be deployed in a network operations center (NOC) of a wireless network operator, e.g., an entity operating the EPC network 105, LTE network 101, access network 103, and so on. Due to the relatively large number of connections available between AS 190 and other network elements, none of the actual links to the application server are shown in FIG. 1. Similarly, links between DRA 106, MME 107, SGW 108, eNodeBs 111 and 112, PDN gateway 110, and other components of system 100 are also omitted for clarity.

In one example, AS 190 may be configured to receive alerts from alert originator devices 175 deployed in networks 170, each of which may be associated with an authorized alert originator. For example, one or more of the alert originator devices 175 may comprise all or a portion of a Federal Emergency Management Administration (FEMA) Integrated Public Alert and Warning System (IPAWS), a NOAA warning system, such as a National Weather Service (NWS) alert server to provide watches, warnings, advisories, or the like in a Common Alerting Protocol (CAP) format, a CDC server for sending health alerts, and so forth. Each of the alerts may notify of an emergency event and provide a location of the emergency event. For instance, an alert may indicate that a tornado is detected and may provide a relevant location, e.g., with geographic coordinates to identify the center of the tornado.

In one example, AS 190 may also receive sensor data from sensor(s) 179, which may be deployed in network(s) 170, or from sensor(s) 119, which may be connected to LTE network 101 via access network 103. For instance, in one example sensor(s) 119 may comprise wireless/cellular communication-enabled devices that are capable of measuring various physical parameters from an environment and reporting such measurements wirelessly via a cellular/wireless link. In one example, sensors 119 may be managed by the EPC network 105 and/or LTE network 101, e.g., by AS 190. In one example, sensor(s) 179 may be operated by the same entity, or entities, that control alert originator device(s) 175. Data from sensor(s) 119 and/or sensor(s) 179 may be used to detect an emergency event, and to detect a location of such an emergency event by network(s) 170 or by EPC network 105 and/or LTE network 101, e.g., by AS 190.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, AS 190, and/or other network components may be deployed in an IMS core network 115 instead of being deployed within the EPC network 105, or in other portions of system 100 that are not shown, while providing essentially the same functionality.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., 2G network, 3G network and the like), for deploying virtual network functions in response to detecting an emergency event. Thus, these and other modifications are all contemplated within the scope of the present disclosure.

FIG. 2 illustrates an additional example network, or system 200 in which embodiments of the present disclosure for deploying virtual network functions in response to detecting an emergency event may operate. In one example, system 200 may represent at least a portion of a cellular/wireless network. For instance, system 200 may represent certain SDN aspects of the network, or system 100 of FIG. 1. As illustrated in FIG. 2, system 200 may include a software defined network SDN controller 250, e.g., a server having at least a processor and a computer-readable medium storing instructions which, when executed by the processor, cause the processor to perform functions for deploying virtual network functions in response to detecting an emergency event, and for performing various other operations in accordance with the present disclosure. In one embodiment, the SDN controller 250 may correspond to AS 190 of the example of FIG. 1. In one embodiment, the SDN controller 250 may comprise a computing system, such as computing system 400 depicted in FIG. 4. In one embodiment, the SDN controller 250 may comprise a plurality of devices that may be co-located, or in distributed locations, and that perform coordinated functions of an SDN controller, as described herein.

As further illustrated in FIG. 2, the system 200 may include a number of network function virtualization infrastructure (NFVI) 201-219 deployed in an area, e.g., in a state, province, country, or other region. In one example, NFVI 201-219 may comprise servers in data centers or in other locations, and that are available as host devices, or "SDN hosts" to host virtual machines comprising virtual network functions VNFs. For example, NFVI 201-219 may comprise shared hardware, e.g., one or more host devices comprising line cards, central processing units (CPUs), or processors, memories to hold computer-readable/computer-executable instructions, code, and/or programs, and so forth. In accordance with the present disclosure, the VNFs may comprise wireless network components, such as LTE components of a MME, a HSS, a DRA, a SGW, a PGW, and so forth, and/or routers, switches, and other devices to support additional traffic related to such components. For ease of illustration, additional components of the system 200 may be omitted from FIG. 2, such as base stations or eNodeBs, and non-NFVI components, such as a "non-virtual" HSS, MME, SGW, PGW, or DRA, the physical links between such components, and so on.

In one example, SDN controller 250 may provision and release instantiations of VNFs, configure alarms, security parameters, routing tables, and other operating parameters for the VNFs. In one example, SDN controller 250 may maintain communications with VNFs and/or host devices/NFVI 201-219 via a number of control links (not shown). Control links may comprise secure tunnels for signaling communications over an underling IP infrastructure of the system 200. In other words, control links may comprise virtual links multiplexed with transmission traffic and other data traversing system 200 and carried over a shared set of physical links. In one example, the SDN controller 120 may also comprise a virtual machine operating on NFVI/host device(s), or may comprise a dedicated device. For instance, controller 250 may be collocated with one or more VNFs, or may be deployed in a different host device or at a different physical location.

In one example, SDN controller 250 may detect an emergency event at a first location 291. For instance, SDN controller 250 may receive sensor readings from a plurality of sensors (not shown) which are indicative of the emergency event at the first location 291. In another example, SDN controller 250 may detect the emergency event at the first location 291 by receiving an alert from a responsible federal, state, or local agency, from an international organization, and so forth.

In one example, the SDN controller 250 may then predict network impacts from the emergency event and define a number of zones 220, 230, and 240 around the first location 291. In the example of FIG. 2, the zones 220, 230, and 240 may be defined concentrically around the first location 291 in which the emergency event is first detected. However, in other examples, zones may be defined differently. For instance, if an emergency event is detected near a coastal location, concentric zones may include areas that are over water. Therefore, asymmetrical zones and/or irregular-shaped zones may be more appropriate. In addition, demographic information may indicate that the network impacts will not be balanced around a central zone. For example, suburbs of a particular city may be concentrated to the west of the city center, while there may be mountains to the east of the city center with far fewer people. Thus, asymmetrical zones and/or irregular-shaped zones may also be appropriate around such a location. In one example, a zone generating algorithm may utilize mobile endpoint device registration information to determine a number of mobile endpoint devices within an area, which may then be utilized to defined zone boundaries in an asymmetrical manner.

In the example of FIG. 2, central zone 220 includes the location 291 in which the emergency event is first detected. In one example, SDN controller 250 may deploy VNFs such that the number of additional VNFs is most concentrated in the central zone 220 as compared to the second zone 230, the third zone 240, etc. For instance, the number of additional VNFs that are deployed in the second zone 230 may have a lesser concentration than the number of VNFs in the central zone 220, e.g., less VNFs per registered mobile endpoint device, less VNFs per square mile of coverage area, etc. Additional VNFs may be deployed in the third zone 240, albeit with a lesser concentration than the second zone 230, and so forth. Thus, there may be a "gradation" of additional VNFs deployed in the system 200, moving from the central zone 220 to subsequent zones moving outward from the first location 291. To illustrate, SDN controller 250 may deploy an additional vMME, two additional vSGWs, an additional vDRA, and an additional vPGW in NFVI 201, and an additional vSGW, an additional vHSS, and two additional vPGWs in NFVI 202, located in the central zone 220. SDN controller 250 may also deploy an additional vSGW and vPGW in NFVI 207, and an additional vSGW and vPGW in NFVI 204, located in the second zone 230. Notably, the second zone 230 has more NFVI available, e.g., NFVI 203, 205, 206, and 208. However, because the network impacts of the emergency event may be less certain and less immediate for the second zone 230, less additional VNFs may be deployed and may be more sparsely dispersed over available NFVI within the second zone 230 as compared to the central zone 220. In addition, in one example, at least one additional VNF may be deployed in the third zone 240, such as an additional vSGW on NFVI 216.

In one example, SDN controller 250 may further configure alarm thresholds for VNFs that are added in response to the detection of the emergency event. In one example, the SDN controller 250 may also adjust alarm thresholds of any additional VNFs already deployed in the central zone 220 or any other zone prior to the detection of the emergency event. The alarm thresholds may relate to various factors that may be indicative of overloading conditions, such as an excessive volume of traffic being processed by the VNF. For instance, an alarm may relate to an excessive number of new call setup signaling messages, an excessive number of wireless channels or bearers that are occupied, and so forth.

In one example, lesser alarm threshold(s) may be set for VNFs that are in the central zone 220 or in zones closer to the central zone. For instance, an alarm threshold may be set at 50 percent capacity for VNFs of a particular type in the central zone 220, while an alarm threshold of 70 percent may be set for VNFs (e.g., of a same or a similar type) in the second zone 230. Thus, there may be a "gradation" of alarm thresholds moving from the central zone 220 to subsequent zones moving outward from the center. It should be noted that different types of VNFs in a same zone may have different alarm thresholds. For instance, a virtual MME (vMME) may have a different alarm threshold, or set of alarm thresholds, than a virtual SGW (vSGW), a vDRA may have different alarm threshold(s) than a vHSS, and so on.

In one example, a VNF reaching an alarm threshold may send a notification of such a condition to the SDN controller 250 and/or to other VNFs and non-NFVI infrastructure (not shown) in the system 200. In one example, the SDN controller 250 may reconfigure an alarm threshold for any one or more VNFs in a same zone as a VNF reaching an alarm threshold and/or in any subsequent zones. For example, a VNF deployed on NFVI 201 in the central zone 220 may reach an alarm threshold, e.g., an alarm threshold of 50 percent capacity, and may notify SDN controller 250. In response, SDN controller 250 may then reduce alarm thresholds for VNFs deployed on NFVI 204 and 207 in the second zone 230 from 70 percent to 50 percent, for instance. In another example, if a VNF deployed on NFVI 204 in the second zone 230 reaches an alarm threshold of 70 percent, for example, the SDN controller 250 may reduce the alarm threshold for a VNF deployed on NFVI 204 in the same zone from 70 percent to 50 percent (e.g., a VNF of a same or a similar type as the VNF generating the alarm notification). In addition, an alarm threshold for a VNF deployed on NFVI 216 in the third zone 240 may be reduced. For instance, if the VNF deployed in NFVI 216 has an alarm threshold of 80 percent, the alarm threshold may be reduced to 70 percent, to 65 percent, etc. In another example, VNFs may communicate alarm notifications directly with one another. As such, in one example, a VNF may determine to adjust its own alarm threshold in response to receiving an alarm notification from a peer VNF, rather than awaiting an instruction from the SDN controller 250.

In one example, in response to receiving an alarm notification, SDN controller 250 may also deploy additional VNFs near the VNF/NFVI that originated the alarm notification. For example, if a VNF of NFVI 207 generates an alarm notification, SDN controller may determine to add an additional VNF at NFVI 206, which may be in a next closest location of available NFVI to NFVI 207 within the same zone (second zone 230). SDN controller 250 may also increase a number of VNFs in a next zone moving away from the first location 291. For example, since a VNF at NFVI 207 in the second zone 230 has already reached an alarm threshold, network impacts of the emergency event may now be considered more likely in the third zone 240, warranting additional VNFs to be deployed in the third zone 240 in anticipation of such network impacts.

In one example, the SDN controller 250 may detect that the emergency event has moved from the first location 291 to a second location 292 and may adjust the central zone 220 to position 225 to include the second location 292. The SDN controller 250 may further adjust the second zone 230 in response to the adjusting the central zone 220. For example, the second zone 230 may be moved to position 235. In this regard, SDN controller 250 may instantiate and/or release any number of VNFs from NFVI 201-219 in response to the movement or spread of the emergency event to the second location 292. For example, SDN controller 250 may arrange the deployments of VNFs in the system 200 such that the central zone 220 at position 225 comprises a greater concentration of VNFs as compared to the second zone 230 at position 235. In the present example, this may include deployments of two additional vPGWs in NFVI 215 and an additional vDRA in NFVI 205 in the central zone 220 at position 225. The SDN controller 250 may also instantiate an additional vSGW at NFVI 219 in the second zone 230 at position 235. It should be noted that the position of the third zone 240 may also be adjusted in response to the detection of the movement of the emergency event to the second location 292. However, for ease of illustration this particular aspect is omitted from the example of FIG. 2. It should also be noted that the alarm thresholds of respective VNFs may also be configured or reconfigured depending upon the inclusions of VNFs/NFVI in different zones after repositioning in response to the movement of the emergency event to the second location 292.

Figure 3:
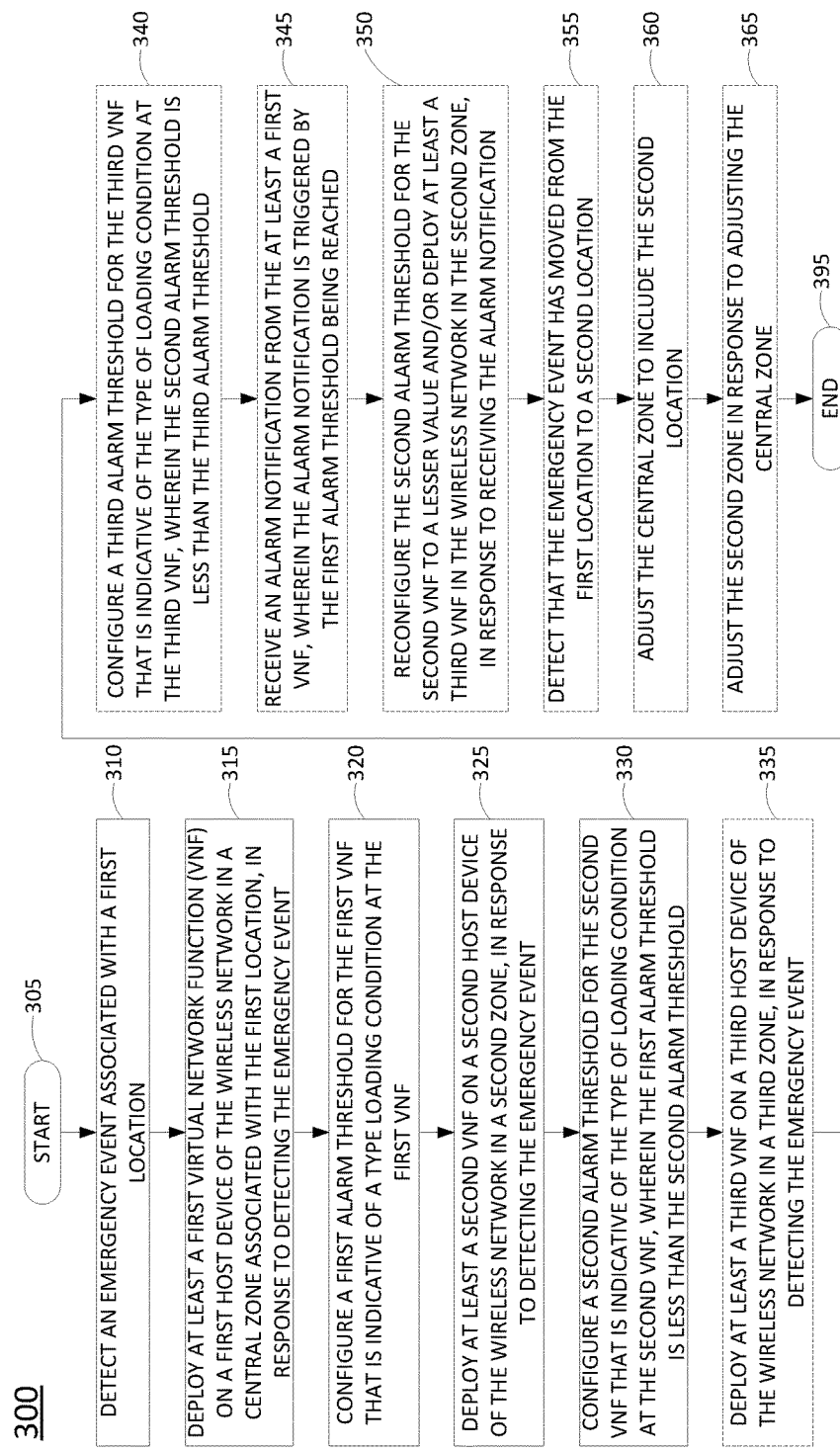
FIG. 3 illustrates a flowchart of an example method for deploying virtual network functions in response to detecting an emergency event, according to the present disclosure.

FIG. 3 illustrates a flowchart of an example method 300 for deploying virtual network functions in response to detecting an emergency event. In one embodiment, the steps, operations or functions of the method 300 may be performed by any one or more of the components of the system 100 depicted in FIG. 1 or the system 200 of FIG. 2. For example, in one embodiment, the method 300 is performed by the application server (AS) 190. In another embodiment, the method 200 is performed by AS 190 in coordination with other components of the system 100. In another example, the method 300 is performed by SDN controller 250 of FIG. 2, or by SDN controller 250 in coordination with other components of the system 200. Alternatively, or in addition, one or more steps, operations or functions of the method 300 may be implemented by a computing device having a processor, a memory and input/output devices as illustrated below in FIG. 4, specifically programmed to perform the steps, functions and/or operations of the method. Although any one of the elements in system 100 of FIG. 1 or system 200 of FIG. 2 may be configured to perform various steps, operations or functions of the method 300, the method will now be described in terms of an embodiment where steps of the method are performed by a processor, such as processor 402 in FIG. 4. For example, processor 402 may be deployed in a wireless network to perform the method 300.

The method 300 begins in step 305 and proceeds to step 310. In step 310, the processor detects an emergency event associated with a first location. In one example, the emergency event and the first location may be detected via an alert from a responsible federal, state, or local agency, from an international organization, and so forth. In another example, the emergency event and the first location may be detected via a plurality of sensors that may be part of the wireless network or controlled by the wireless network. Alternatively, or in addition, a sensor network may feed various measurements to the processor in the wireless network or may send alerts to the processor that are indicative of the emergency event and its location.

At step 315, the processor deploys at least a first virtual network function (VNF) on a first host device of the wireless network in a central zone associated with the first location, in response to detecting the emergency event. In one example, the processor may determine a plurality of zones surrounding the first location, where the plurality of zones may comprise a central zone that includes the first location, and at least a second zone. In one example, the second zone may surround the first zone. In one example, a third zone and subsequent zones may also be defined. In one example, the zones may be concentric around the first location and cover a geographic area, such as a county, a state, a province, a country, or other region. In another example, the zones may be asymmetrically defined and/or comprise irregular shapes. For instance, the central zone, the second zone, and any subsequent zones may be defined based upon a distribution of mobile endpoint device registrations with the wireless network. In another example, the zones may be defined based upon historical network traffic patterns in the wireless network for a region that includes the first location. For example, the historical network traffic patterns may relate to at least one previous emergency event of a same type as the current emergency event. Alternatively, or in addition, the zones may be asymmetrical and/or irregularly defined based upon geographic factors, such as oceans, mountains, swamps, etc., based upon census information indicative of general populations of various areas, and so forth. For instance, the processor may have access to a geographic information system (GIS) with such information in an electronic format that can be cross-referenced to the first location in which the emergency event is detected.

At least a first VNF that is deployed in the central zone may function as any one or more wireless network components, such as a HSS, a MME, a SGW, a PGW, a DRA, routers and other infrastructure comprising links between such components, and so forth. In one example, the selection of the type(s) of VNFs may be based upon the type of emergency event.

At step 320, the processor configures a first alarm threshold for the first VNF that is indicative of a type of loading condition at the first VNF. For example, one of the functions of a DRA is to route signaling messages from mobile endpoint devices via a MME to a HSS. Thus, an alarm threshold at the DRA may comprise a threshold number of signaling messages received on an incoming interface from an MME, a number of signaling messages on an outgoing interface to the HSS, and so on. In general, different types of alarm thresholds, and different values for such alarm thresholds may be selected based upon the type of VNF.

At step 325, the processor deploys at least a second VNF on a second host device of the wireless network in a second zone, in response to detecting the emergency event. The second zone may be defined with respect to the central zone as described above. The at least a second VNF may comprise the same or different type of VNF, or VNFs, as the at least a first VNF deployed in the central zone. In one example, the at least a first VNF may comprise a first plurality of VNFs, and at least a second VNF may comprise a second plurality of VNFs. In addition, in one example, the first plurality of VNFs may be deployed with a greater concentration of VNFs in the central zone as compared to a concentration of the second plurality of VNFs that are deployed in the second zone. In one example, a concentration of the first plurality of VNFs and a concentration of the second plurality of VNFs are calculated based upon historical network traffic patterns in the wireless network for a region that includes the first location and relating to at least one previous emergency event of a same type as the current emergency event.

At step 330, the processor configures a second alarm threshold for the second VNF that is indicative of the type of loading condition at the second VNF. For instance, in one example, the first VNF and the second VNF may be a same type of VNF. However, because the first VNF is within the central zone, it may be the case that there is a greater likelihood that the first VNF may become quickly overloaded and enter a "drowning" state. As such, in one example, the alarm threshold for the first VNF may be less than the alarm threshold for the second VNF. For instance, the alarm threshold for the first VNF may be 50 percent of a maximum number of signaling messages to be processed in a given time, while the alarm threshold for the second VNF may be 70 percent of a maximum number of signaling messages to be processed in the given time.

At optional step 335, the processor may deploy at least a third VNF on a third host device of the wireless network in a third zone, in response to detecting the emergency event. In one example, the second VNF and the third VNF may include VNFs of a same type. In one example, the number of additional VNFs that are deployed in the third zone may have a lesser concentration than the number of VNFs in the second zone. Thus, there may be a "gradation" of additional VNFs deployed in the wireless network, moving from the central zone to the second zone, the third zone, and so on.

At optional step 340, the processor may configure a third alarm threshold for the third VNF that is indicative of the type of loading condition at the third VNF. In one example, the third alarm threshold is less than the second alarm threshold. For instance, the second VNF and the third VNF may be a same type of VNF, and the second alarm threshold and the third alarm threshold may relate to a same type of loading condition. Thus, there may be a "gradation" of alarm thresholds moving from the central zone to the second zone, the third zone, and so on.

At optional step 345, the processor may receive an alarm notification from the at least a first VNF, triggered by the first alarm threshold being reached. For instance, the at least a first VNF may detect that the first alarm threshold is reached, and may send an alarm notification to the processor and/or to other VNFs and non-NFVI components within the wireless network.

At optional step 350, the processor may reconfigure the second alarm threshold for the second VNF to a lesser value and/or deploy at least a third VNF in the wireless network in the second zone, in response to receiving the alarm notification. For instance, when an alarm is generated in a zone, the alarm threshold(s) implemented in VNFs in the next zone moving outward may be adjusted downward, and so on, zone-by-zone. For instance, the second alarm threshold for the second VNF may be changed from 70 percent to 50 percent, from 65 percent to 55 percent, etc. Likewise, the number of VNFs in a zone may also be increased if an alarm is generated in a central zone and/or in a zone that is closer to the central zone. In this way, as the network impacts of the emergency event may spread geographically, the network impacts may be anticipated and accounted for before different regions of the network are actually overloaded.

At optional step 355, the processor may detect that the emergency event has moved from the first location to a second location. For example, as a tornado moves through a region, the processor may detect that the current location of the tornado has changed from the first location to the second location. In one example, the movement of the emergency event from the first location to the second location may be detected based upon updated measurements from a plurality of sensors, such as wind speed measurements indicative of the current location of a tornado. In another example, the changing location of the emergency event may be provided via a data feed and/or an update message from a relevant agency. For instance, a data feed from NOAA may comprise a series of update messages that explicitly define a current geographic location/area of a thunderstorm, where the geographic location may be updated on a regular basis.

At optional step 360, the processor may adjust the central zone to include the second location. For instance, the central zone may be moved from being centered on the first location to being centered on the second location. In one example, the adjusting may include maintaining a larger concentration of additional VNFs in the central zone after the central zone is moved. For instance, this may include the deployment of additional VNFs within the central zone after the move.

At optional step 365, the processor may adjust the second zone in response to the adjusting the central zone. For instance, once the central zone is adjusted, the deployment of additional VNFs and the provisioning of alarm thresholds may be revised for the new central zone, and the zones surrounding the central zone, in a similar manner as described above. For example, between optional steps 360 and 365, the processor may arrange the wireless network such that after adjusting the central zone and the second zone, the central zone comprises a greater concentration of VNFs as compared to the second zone. In one example, additional adjustments may be made to a third and any subsequent zones in a similar manner.

Following step 330, or following any of optional steps 335-365, the method 300 may proceed to step 395 where the method ends.

In addition, although not specifically specified, one or more steps, functions, or operations of the method 300 may include a storing, displaying and/or outputting step as required for a particular application. In other words, any data, records, fields, and/or intermediate results discussed in the method 300 can be stored, displayed, and/or outputted either on the device executing the respective method or to another device, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step. Moreover, steps, blocks, functions, or operations of the above described method 300 can be combined, separated, omitted, and/or performed in a different order from that described above, without departing from the examples of the present disclosure.

Figure 4:
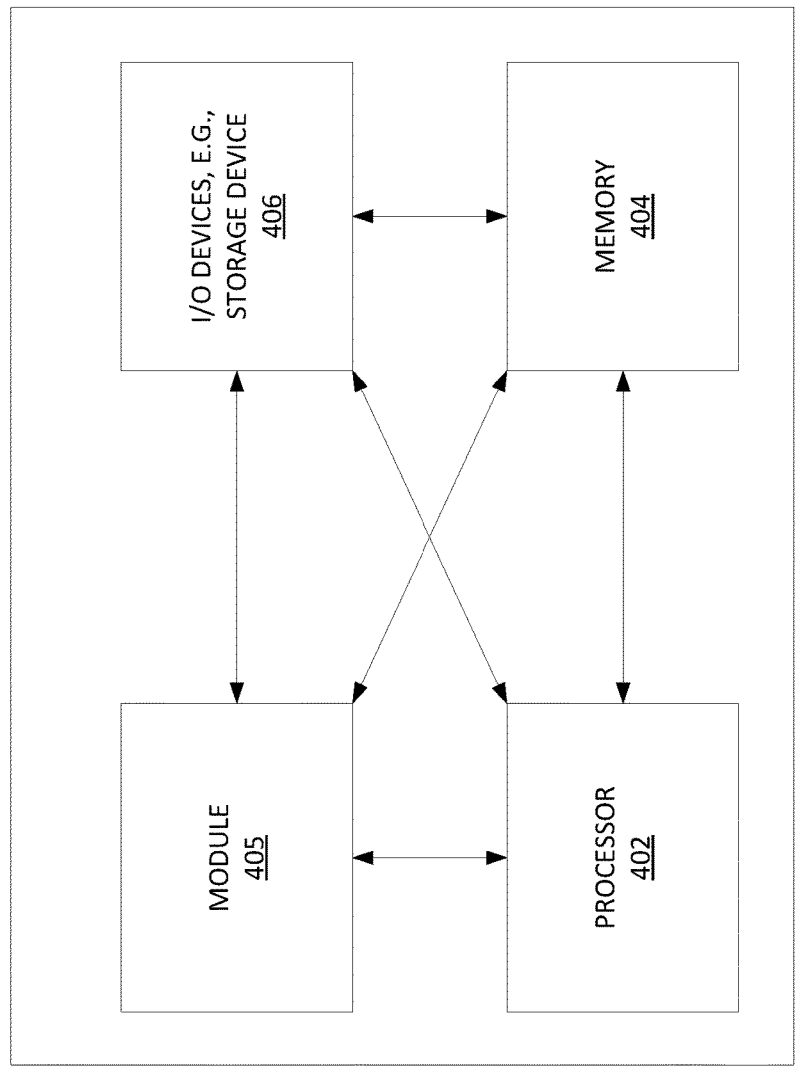
FIG. 4 illustrates a high-level block diagram of a computing device specially configured to perform the functions, methods, operations and algorithms described herein.

FIG. 4 depicts a high-level block diagram of a computing device specifically programmed to perform the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for deploying virtual network functions in response to detecting an emergency event, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., certain steps of the above method 300, or the entire method 300 is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for deploying virtual network functions in response to detecting an emergency event (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for deploying virtual network functions in response to detecting an emergency event (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described example embodiments, but should be defined only in accordance with the following claims and their equivalents.

What is claimed is:

1. A method comprising:
   detecting, by a processor of a wireless network, an emergency event associated with a first location;
   deploying, by the processor, a first virtual network function on a first host device of the wireless network in a central zone associated with the first location, in response to the detecting the emergency event;
   configuring, by the processor, a first alarm threshold for the first virtual network function that is indicative of a type of loading condition at the first virtual network function;
   deploying, by the processor, a second virtual network function on a second host device of the wireless network in a second zone, in response to the detecting the emergency event; and
   configuring, by the processor, a second alarm threshold for the second virtual network function that is indicative of the type of loading condition at the second virtual network function, wherein the first alarm threshold is less than the second alarm threshold.

2. The method of claim 1, wherein the emergency event is detected via an alert from a device of a responsible agency.

3. The method of claim 1, wherein the emergency event comprises:
   a natural disaster;
   a weather event; or
   an epidemiological event.

4. The method of claim 1, wherein the first virtual network function comprises one of a first plurality of virtual network functions that is deployed in the central zone, wherein the second virtual network function comprises one of a second plurality of virtual network functions that is deployed in the second zone, wherein the first plurality of virtual network functions is deployed with a greater concentration of virtual network functions in the central zone as compared to a concentration of the second plurality of virtual network functions that is deployed in the second zone.

5. The method of claim 4, wherein the emergency event comprises a current emergency event, wherein a concentration of the first plurality of virtual network functions and the concentration of the second plurality of network functions are calculated based upon historical network traffic patterns in the wireless network for a region that includes the first location for at least one previous emergency event of a same type as the current emergency event.

6. The method of claim 1, wherein the emergency event comprises a current emergency event, wherein the central zone and the second zone are determined based upon historical network traffic patterns in the wireless network for a region that includes the first location for at least one previous emergency event of a same type as the current emergency event.

7. The method of claim 1, wherein the central zone and the second zone are determined based upon a distribution of mobile endpoint device registrations with the wireless network.

8. The method of claim 1, wherein the central zone includes the first location, and wherein the second zone surrounds the central zone.

9. The method of claim 1, further comprising:
deploying, by the processor, a third virtual network function on a third host device of the wireless network in a third zone, in response to the detecting the emergency event; and
configuring, by the processor, a third alarm threshold for the third virtual network function that is indicative of the type of loading condition at the third virtual network function, wherein the second alarm threshold is less than the third alarm threshold.

10. The method of claim 9, wherein the third virtual network function comprises one of a third plurality of virtual network functions that is deployed in the third zone.

11. The method of claim 1, further comprising:
receiving an alarm notification from the first virtual network function, wherein the alarm notification is triggered by the first alarm threshold being reached; and
reconfiguring the second alarm threshold for the second virtual network function to a lesser value.

12. The method of claim 1, further comprising:
receiving an alarm notification from the first virtual network function, wherein the alarm notification is triggered by the first alarm threshold being reached; and
deploying at least a third virtual network function in the wireless network in the second zone, in response to the receiving the alarm notification.

13. The method of claim 1, wherein the processor comprises a processor of a software defined network controller.

14. The method of claim 1, further comprising:
detecting that the emergency event has moved from the first location to a second location;
adjusting the central zone to include the second location; and
adjusting the second zone in response to the adjusting the central zone, wherein the central zone comprises a greater concentration of virtual network functions as compared to the second zone, after the adjusting the central zone to include the second location and the adjusting the second zone in response to the adjusting the central zone.

15. The method of claim 14, wherein the emergency event is detected via an alert from a device of a responsible agency, wherein the detecting that the emergency event has moved from the first location to the second location comprises receiving an update message from the responsible agency.

16. The method of claim 1, wherein each of the first virtual network function and the second virtual network function comprises one of:
a mobility management entity;
a diameter routing agent;
a home subscriber server;
a packet data network gateway; or
a serving gateway.

17. A non-transitory computer-readable medium storing instructions which, when executed by a processor of a wireless network, cause the processor to perform operations, the operations comprising:
detecting an emergency event associated with a first location;
deploying a first virtual network function on a first host device of the wireless network in a central zone associated with the first location, in response to the detecting the emergency event;
configuring a first alarm threshold for the first virtual network function that is indicative of a type of loading condition at the first virtual network function;
deploying a second virtual network function on a second host device of the wireless network in a second zone, in response to the detecting the emergency event; and
configuring a second alarm threshold for the second virtual network function that is indicative of the type of loading condition at the second virtual network function, wherein the first alarm threshold is less than the second alarm threshold.

18. The non-transitory computer-readable medium of claim 17, wherein the emergency event is detected via an alert from a device of a responsible agency.

19. The non-transitory computer-readable medium of claim 17, wherein the emergency event comprises:
a natural disaster;
a weather event; or
an epidemiological event.

20. A device comprising:
a processor of a wireless network; and
a computer-readable medium storing instructions which, when executed by the processor, cause the processor to perform operations, the operations comprising:
detecting an emergency event associated with a first location, wherein the emergency event is detected via an alert from a device of a responsible agency;
deploying a first virtual network function on a first host device of the wireless network in a central zone associated with the first location, in response to the detecting the emergency event;
configuring a first alarm threshold for the first virtual network function that is indicative of a type of loading condition at the first virtual network function;
deploying a second virtual network function on a second host device of the wireless network in a second zone, in response to the detecting the emergency event; and
configuring a second alarm threshold for the second virtual network function that is indicative of the type of loading condition at the second virtual network function, wherein the first alarm threshold is less than the second alarm threshold.

* * * * *